T. B. Smith,
Track Clearer.

No. 11,273. Patented July 11, 1854.

UNITED STATES PATENT OFFICE.

THOMAS B. SMITH, OF TRIUNE, TENNESSEE.

COW-CATCHER.

Specification of Letters Patent No. 11,273, dated July 11, 1854.

*To all whom it may concern:*

Be it known that I, THOMAS B. SMITH, of Triune, in the county of Williamson and State of Tennessee, have invented a new and useful Improvement in Cow-Catchers of Locomotives; and I do hereby declare that the following is a full, clear, and exact description of the construction and operation of the same, reference being had to the annexed drawings, forming part of this specification, in which—

Figure 2:
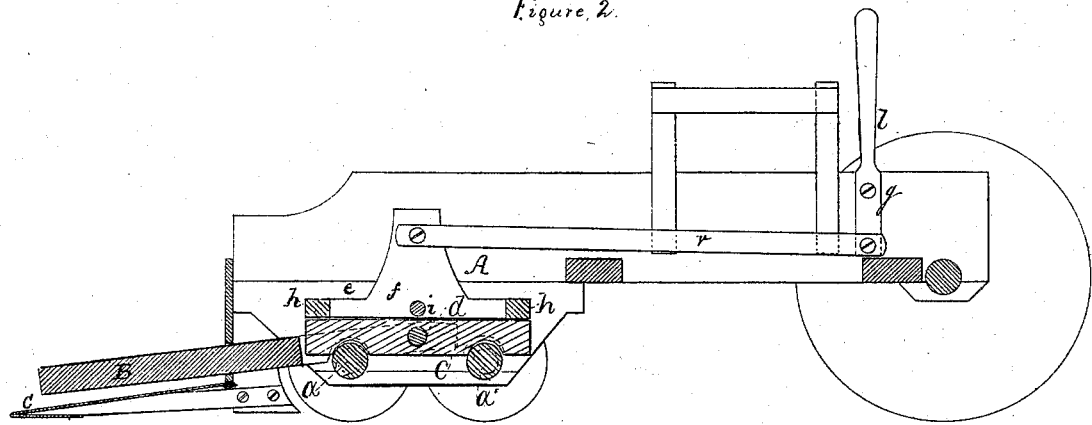
Figure 1:
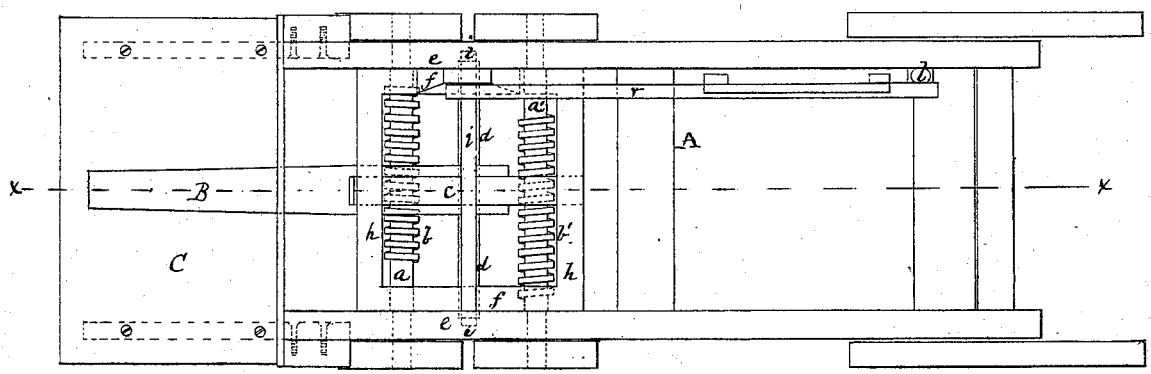

Figure 1 is a plan of the apparatus, and Fig. 2 a vertical section on line $x$ $x$ of Fig. 1.

Similar characters of reference denote the same parts.

My invention consists in constructing on the two forward axles of the locomotive, screw threads running in opposite directions, and in connecting with oscillating nuts fitting said threads, a longitudinal beam or scraper, which is made to traverse laterally over the cow catcher by the action of said screws on the nuts, produced by the rotation of the axles carrying the screws; a system of levers hereafter to be described serving to form and break the contact of the screws and nuts as the circumstances of the case may require.

To enable others skilled in the art to make and use my invention I will proceed to describe its construction and operation.

In the drawing A is the frame of the locomotive and $a$ $a'$ its forward axles, on which are the screw threads $b$ $b'$, running in opposite directions.

C is a flat inclined cow catcher, over which is the beam or scraper B, jointed with the nut piece $c$ by the bar $d$ passing entirely across the frame of the locomotive and through its cheeks $e$. Suspended between the cheeks $e$ by the bar $i$ is a frame composed of the sides $f$ and cross pieces $h$, the latter resting upon the nut piece $c$, so that the oscillation of said frame upon the bar $i$ will alternately depress the opposite extremities of the nut piece $c$, causing one of the nuts to mesh with its respective screw thread. This oscillation of the frame $f$ $h$ is produced by the lever $l$ having its fulcrum at $(g)$ and its short arm connected by the rod $r$ with the side piece $f$ of the frame $f$ $h$. This attachment will not effect the construction of the other portions of the locomotive, which will not therefore require any particular description.

The operation of my improved attachment is as follows: If so desired, the nut piece $c$ may remain as shown in the drawing, being clear of the threads of both screws. A movement of the lever $l$ will depress one of the ends of the nut piece $c$, and cause the nut of that extremity to mesh with the thread beneath it, producing an immediate lateral movement of the nut piece along the bar $d$, carrying with it the beam or scraper B which sweeping the surface of the cow catcher, will remove anything which may be caught thereon; a reverse movement of the lever $l$ will bring the other nut in gear with its screw, and produce the traversing of the beam B in the opposite direction from that above described. In this manner by moving the lever $l$, the beam or scraper B may be made to traverse alternately from side to side of the cow catcher, and prevent the carrying of anything that may be caught up. Or, the nut piece $c$ may be kept in the position shown in the drawing, and be depressed upon a screw as occasion may require the assistance of the beam to remove an obstruction.

What I claim as my invention, and desire to secure by Letters Patent, is

The beam or scraper B in combination with the nut piece $c$ and screws $b$ $b'$ arranged and operating as herein described to produce the alternate lateral movement of the beam over the surface of the cow catcher for the purposes set forth.

In testimony whereof I have hereunto signed my name before two subscribing witnesses.

T. B. SMITH.

Witnesses:
 MILTON H. PAGE,
 JOHNSON O. WOOD.